United States Patent [19]
Hunter

[11] 3,879,018
[45] Apr. 22, 1975

[54] VIBRATORS

[76] Inventor: William Allan Hunter, 2222 Hammond Dr., Inverness Countryside, Ill. 60172

[22] Filed: Mar. 21, 1974

[21] Appl. No.: 453,329

[52] U.S. Cl. ............ 259/1; 91/25; 91/234; 259/DIG. 43
[51] Int. Cl. ............................................. B06b 1/18
[58] Field of Search ....... 259/DIG. 43, 1 R; 91/234, 91/24, 25, 28

[56] References Cited
UNITED STATES PATENTS

| | | | |
|---|---|---|---|
| 1,245,603 | 11/1917 | Lewis | 259/DIG. 43 |
| 1,486,486 | 3/1924 | Gates | 91/234 |
| 1,486,491 | 3/1924 | Krause | 259/DIG. 43 |
| 1,599,299 | 9/1926 | Stoney | 259/DIG. 43 |
| 3,718,318 | 2/1973 | Blower et al. | 259/DIG. 43 |

Primary Examiner—Robert W. Jenkins
Assistant Examiner—J. Niegowski

[57] ABSTRACT

A vibrator operable by gaseous pressure fluid comprises a body member with its ends constrained between elements of an article to be vibrated, and has a bore and a spool member slidable therein. A plug formed of impact resistant material is disposed at each end of the bore and transmits impulses into the article upon excursion of the spool member to and fro. The spool has alternating grooves and lands with a central groove flanked at each side by a land. Each land has a groove flanking the same, and a land of lesser diameter than the bore is at each end of the spool and is adapted to contact a correlative plug. Structure for supplying pressure fluid to cause the spool to have to and fro excursion comprises a supply manifold, with a passageway including a valve therein normally biased to closed position, is connected to supply pressure against one of the lands flanking the center groove, the valve upon such stalling being biased to closed position to resume the normal operation and excursion of the spool.

9 Claims, 4 Drawing Figures

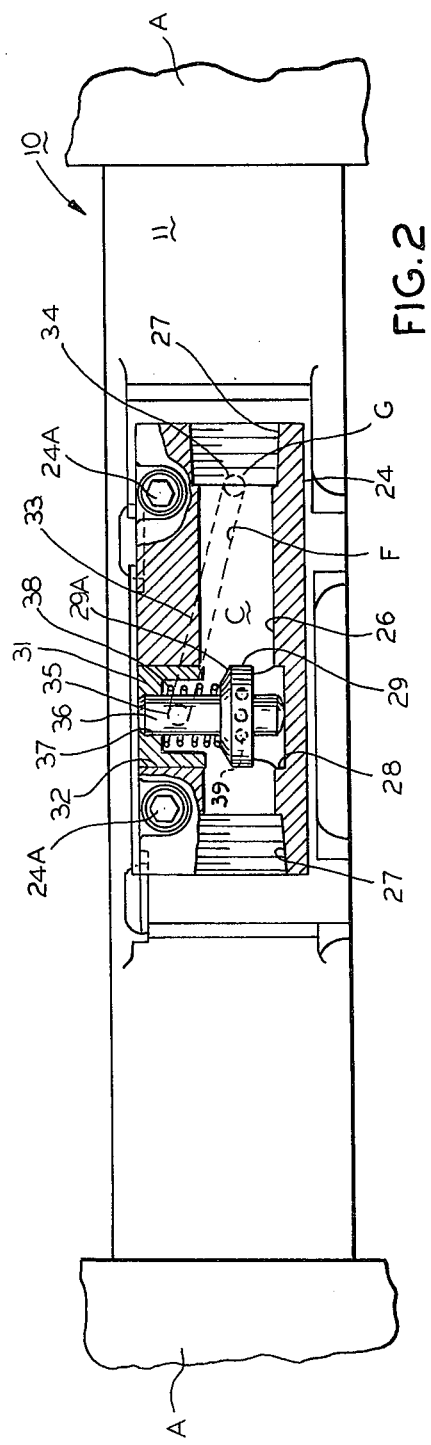
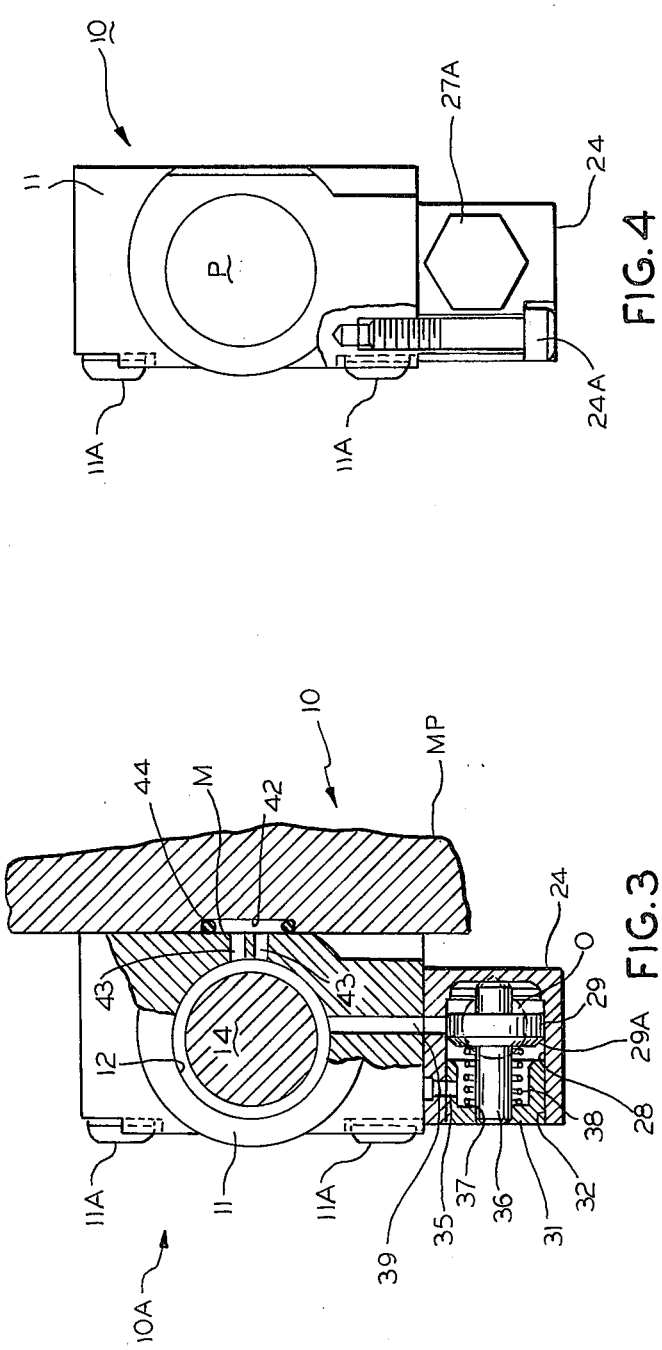

VIBRATORS

BACKGROUND OF THE INVENTION

The structure according to the present invention relates to vibrators of the type having a spool member having to and fro excursion in a body member to cause vibration of an article. The known devices of the prior art have been unable to restart when the spool occupied a stalled position, excepting for the provision of a spring or other energy storing device at one end of the spool to recommence excursion of the spool member.

According to the present invention it is not necessary to have a spring mounted at one end of the spool member to restart excursion, and both ends of the spool member are accordingly so constructed so as to have direct impact against the article to be vibrated. Since the restarting device according to the present invention is called upon infrequently, the necessity of employing a spring subject to fatigue by reason of constant work imposed thereon is thereby eliminated, and the vibrator will have a long life without maintenance.

SUMMARY OF THE INVENTION

It is an object of the invention to provide a vibrator operable by pressure fluid and characterized by a vibrating spool movable into contact at each end of its stroke with a plug having a high impact resistance and a noise dampening quality. The plug has a light press fit at each end of the vibrator body, and is in contact with the article to be vibrated. The vibrator is constrained in position between a pair of spaced abutments on the vibrated article. The plug may be made for example, of a linear amide copolymer, nylon being an example of such material.

THE DRAWINGS

FIG. 2 is a longitudinal sectional view through a supply manifold for the vibrator of FIG. 1, certain parts being shown in elevation, said view taken along the line 2—2 of FIG. 1 looking in the direction of the arrows;

FIG. 3 is a sectional view taken along the line 3—3 of FIG. 1 looking in the direction of the arrows; and FIG. 4 is an end view of the vibrator looking from the right to the left as seen in FIG. 1.

Figure 1:
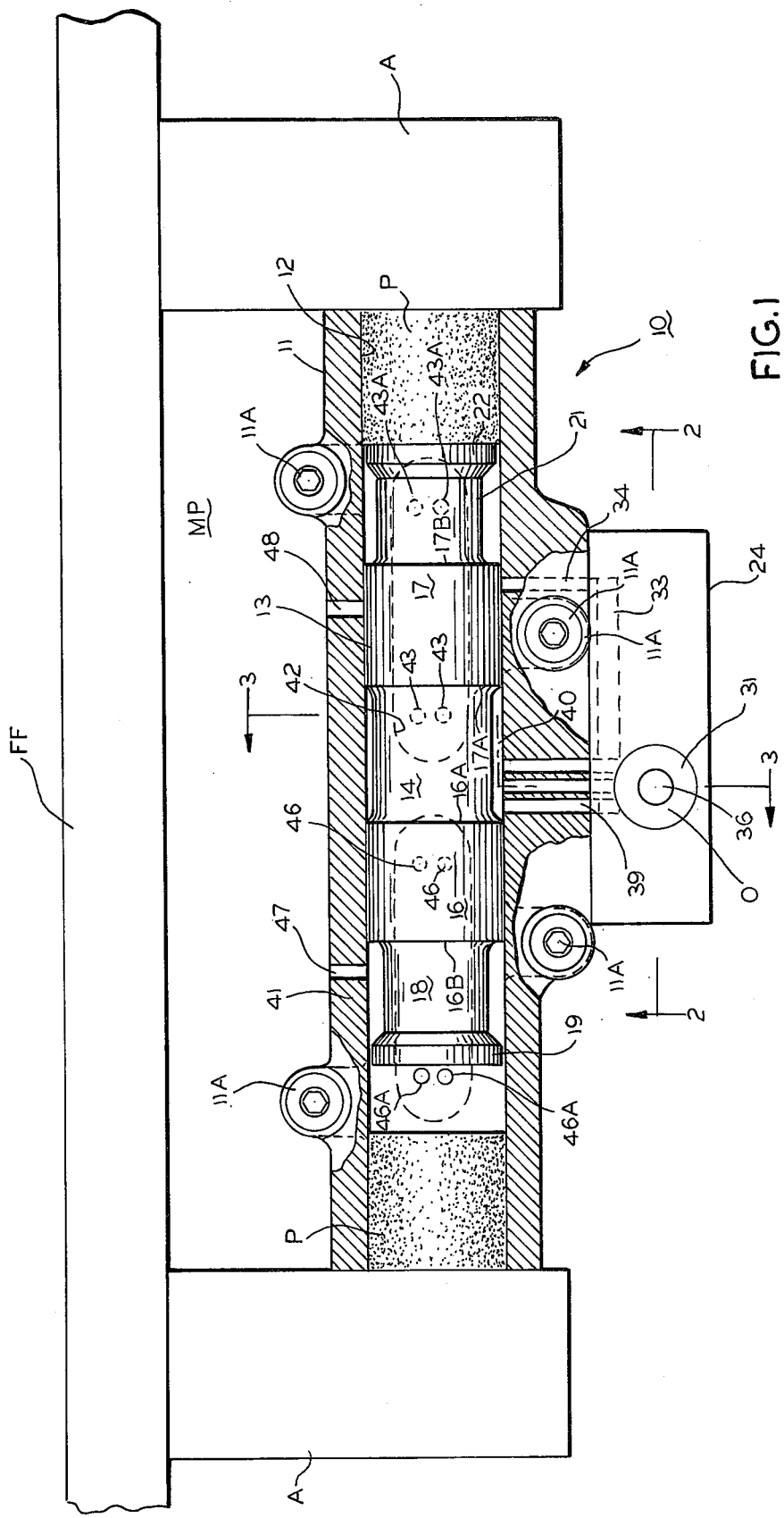
FIG. 1 is a longitudinal sectional view through a vibrator having the improvements according to the present invention embodied therein, showing the vibrator in position with respect to vibrated article, certain parts being shown in plan view.

The improved vibrator according to the present invention is denoted generally by the reference numeral 10, and is shown in position between a pair of spaced abutments A extending from a vibrated article such as a foundry flask indicated generally by the letters FF. Vibrator 10 comprises a body member 11 held by mounting screws 11A tapped into a mounting plate MP extending between the spaced abutments A and secured thereto. Body member 11 has a longitudinal bore 12 therein and a spool member 13 is mounted for excursion to and fro within the bore 12, spool member 13 moving toward and away from plug P at each end of the bore 12 and in contact with its adjacent abutment A. Each plug P has a press fit within the bore 12, and is in contact with its adjacent abutment A during excursion of the spool member 13 within bore 12. By reason of the excursion of spool 13, the impact thereof causes plugs P to tighten in bore 12.

Spool member 13 is provided with alternating grooves and lands, there being a central groove 14 flanked by lands 16 and 17 fitting smoothly within bore 12. Land 16 has a pressure face 16A at the groove 14 at one end thereof, and a pressure face 17A is provided on land 17 at the other end of groove 14. Land 16 is flanked to one side by a groove 18, and an end land 19 of slightly smaller diameter than the diameter of the bore 12 is spaced from the land 16 the left end of land 16 having a pressure face 16B. Land 17 is flanked by a groove 21, and an end land 22 at the right end of the spool 13 is similar to the land 19 at the opposite end of the spool 13, land 22 moving toward and away from its correlative plug P upon excursion of the spool 13 as does land 19 with its correlative plug P.

Structure is provided for supplying pressure fluid to the body member 11 to cause the spool member 13 to have to and fro excursion in the bore 12, and comprises a manifold 24 having a longitudinal bore 26 therein, pressure fluid being supplied to the ends of the passageway 26 at a threaded fitting opening 27, one end of which may be closed by a plug 27A. If desired, manifold 24 may be connected in series or tandem with pressure lines, not shown, connected at each opening 27. Pressure passageway 26 is intersected at right angles by a second pressure passageway 28, and manifold 24 is closed at one side thereof by a valve seat member 31 press fitted into passageway 28.

A valve poppet 29 has a valve face 29A normally adapted to seat against a valve seat member 31, having a stem 36 guided in a bore 37 in the valve seat member 31. A spring 38 is biased between the valve seat 31 and poppet 29 which during normal operation is in open position, but which is in a closed position, as when the supply of pressure fluid is cut off and during start of excursion. Normally, the poppet 29 is closed against the valve seat member 31, and opens ports 39 in the bore 26 to supply pressure fluid to an annular pressure chamber 40 in the bore 12 adjacent grooves 14.

As seen in FIGS. 1 and 3, mounting plate MP is provided with spaced milled slots forming passageways 41 and 42, milled slot 41 having ports 46 and 46A connected to bore 12, slot 42 having ports 43 and 43A connected to bore 12.

In the position seen in FIG. 1, the spool 13 has completed its excursion to the right hand plug P seen, and is ready to commence its excursion to the left. At this juncture, the left end of the spool 13 is connected to exhaust past the land 19 of reduced diameter past the groove 18 adjacent thereto and out an exhaust port 47. Passageway 41 is likewise connected to exhaust at ports 46A thereof, land 16 at this juncture lapping ports 46.

Pressure is now applied to face 17B of land 17 by way of passageway 42 past ports 43 and 43A, and spool 13 commences its excursion to the left whereby the land 19 at the left end of spool 13 contacts plug P at the left end of the valve body 11. At the end of its travel, the right end of land 17 unlaps an exhaust port 48, reducing the pressure at the right end of spool 13, ports 43 at this time being lapped.

It may be noted that as land 16 moves to the left port 47 will be lapped, and pressure will be applied to the left end of land 16 at its pressure face 16B by the ports 46A, travel of spool 13 now commencing to the right. Pressure at this time is applied to the face 16B of land 16, port 48 at this time being unlapped, and the right end of spool 13 and the groove 21 being at exhaust pressure, passageway 42 at this time also being at exhaust pressure.

At times spool 13 may by chance become centered when stopping vibrator 10, lapping both exhaust ports 47 and 48, and the excursion of spool 13 can be recommenced by a starting device incorporated with the manifold 24. At such times when spool 13 is centered, pressure will initially be supplied via the passageway 33, thus offsetting spool 14 during initial application of air, and therefore allowing normal start. Note that with poppet 29 biased to position closing ports 39 initial flow of air is allowed only to passage 33. Poppet 29, which is closed during the normal operation against the seat 31, has a port 35 thereat connected to a passageway 34 adjacent the pressure face 17B of land 17 when the spool 13 is centered. Pressure is now equal along both faces of poppet 29, and spring 38 is effective to move poppet 29 to the closed position seen in FIG. 3 lapping ports 39 to the central groove 14 of spool 13.

When pressure fluid is first applied and until pressure in the starter reaches a level determined by selection of spring 31, poppet 29 blocks passage 39 and admits air through passage 33. If the spool is offset in either direction air in passage 33 is not important, and poppet 29 will offset as pressure rises, and reciprocation will begin normally. Only if the piston is centered will air pass momentarily thru 33 into the right end of the body and cause the piston to move off dead center where normal starting can take place. During operation poppet 29 remains offset, spring 38 maintaining same in the open position.

I claim:

1. A vibrator comprising:
   a. a body member;
   b. a bore in said body member and a spool member disposed in said bore and movable therein;
   c. a plug formed of impact resistant material at each end of said bore, and being adapted to transmit impulses upon excursions to and fro of said spool member;
   d. said spool member having;
      i. alternating grooves and lands comprising a central groove and lands flanking said central groove and closely fitting in said bore;
      ii. a groove flanking each of said lands, each of said grooves being flanked by a land of lesser diameter than said bore and adapted to contact a correlative one of said plugs;
   e. means for supplying a pressure fluid to said body member to cause said spool member to have to and fro excursion in said bore to contact said plugs comprising;
   f. source of pressure fluid connected to said central groove;
   g. an exhaust port in said body member disposed to each side of said source and lapped and unlapped in accordance with the excursion of said spool member by the correlative land flanking said central groove;
   h. means for causing said spool member to commence excursion when stalled in a position where both of said exhaust ports are lapped by said spool member comprising:
      i. an auxiliary passageway connected to said source of pressure fluid including a valve therein biased to closed position turning normal excursion of said spool member;
      ii. said passageway being connected to said bore one of said grooves flanking said central groove;
      iii. said valve being biased to an open position and to a position to close the supply of pressure fluid to said central groove and create a force on said spool to restart said spool for its regular excursion.

2. A vibrator according to claim 1 including spaced passageways selectively connected to said central groove to apply pressure to correlative faces of said spaced lands flanking said central groove.

3. A vibrator according to claim 2 wherein said spaced passageways are alternately connected to said pressure source and to exhaust.

4. A vibrator comprising:
   a. a body member having its ends constrained between elements of an article to be vibrated;
   b. a bore in said body member and a spool member disposed in said bore and slidable therein;
   c. a plug formed of impact resistant material at each end of said bore and adapted to transmit impulses into said article upon excursions to and fro of said spool member;
   d. said spool member having:
      i. alternating grooves and lands comprising a central groove and lands flanking said central groove and closely fitting in said bore;
      ii. a groove flanking each of said lands, each of said grooves being flanked by a land of lesser diameter than said bore and adapted to contact a correlative one of said plugs;
   e. structure for applying a pressurized gas to said body member to cause said spool member to have to and fro excursion in said bore to contact said plugs comprising;
   f. a manifold connected to a source of pressurized gas and having a passageway to said central groove of said spool member;
   g. an exhaust port in said body member disposed at each side of said passageway and lapped and unlapped in accordance with the excursion of said spool member by the correlative land flanking said central groove;
   h. means for causing said spool member to commence excursion when stalled in a position where both of said exhaust ports are lapped comprising;
      i. an auxiliary passageway in said manifold including a valve therein normally biased to closed position during normal excursion of said spool member;
      ii. said passageway being connected to said bore one of said grooves flanking said central groove;
      iii. said valve being biased to an open position and to a position to close the supply of pressure fluid to said central groove and create a force on said spool to restart said spool for its regular excursion.

5. A vibrator according to claim 4 wherein said article to be vibrated has a mounting member thereon having spaced passageways therein selectively connected to said central groove to apply pressure to correlative faces to said spaced lands flanking said central groove.

6. A vibrator according to claim 5 wherein said spaced passageways are alternately connected to said pressure source and to exhaust.

7. A vibrator according to claim 4 including spaced passageways selectively connected to said central groove to apply pressure to correlative faces of said spaced lands flanking said central groove.

8. A vibrator according to claim 7 wherein said passageways are alternately connected to said pressure source and to exhaust.

9. A vibrator according to claim 4 wherein the excursion of said spool causes said plugs to tighten in said bore by impact thereagainst.

* * * * *